United States Patent
Ushiku

(10) Patent No.: US 6,782,348 B2
(45) Date of Patent: Aug. 24, 2004

(54) APPARATUS FOR DIAGNOSING FAILURE IN EQUIPMENT USING SIGNALS RELATING TO THE EQUIPMENT

(75) Inventor: Yukihiro Ushiku, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 110 days.

(21) Appl. No.: 10/105,381

(22) Filed: Mar. 26, 2002

(65) Prior Publication Data

US 2002/0193891 A1 Dec. 19, 2002

(30) Foreign Application Priority Data

Mar. 27, 2001 (JP) .................................... P2001-090585

(51) Int. Cl.⁷ .............................................. G06F 11/30
(52) U.S. Cl. .......................... 702/183; 702/33; 702/34; 702/35; 702/57; 702/58; 702/185; 700/121; 714/48
(58) Field of Search ................................ 702/183, 185, 702/33–35, 57, 58; 250/559.39, 559.15; 700/121, 175–181; 438/12; 714/48; 716/4

(56) References Cited

U.S. PATENT DOCUMENTS

| | | | | |
|---|---|---|---|---|
| 5,442,562 A | * | 8/1995 | Hopkins et al. | ............ 700/108 |
| 5,680,409 A | * | 10/1997 | Qin et al. | .................... 714/799 |
| 5,684,892 A | * | 11/1997 | Taguchi | ...................... 382/193 |
| 6,012,005 A | | 1/2000 | Gscheidle et al. | ............ 701/34 |
| 6,598,195 B1 | * | 7/2003 | Adibhatla et al. | .......... 714/745 |

FOREIGN PATENT DOCUMENTS

| | | |
|---|---|---|
| JP | 10-115534 | 5/1998 |
| JP | 11-312288 | 11/1999 |

OTHER PUBLICATIONS

Materials for the Supporters Association of the Mahalanobis–Taguchi–Schmidt, Shoichi Tejima, 2001.

* cited by examiner

*Primary Examiner*—John Barlow
*Assistant Examiner*—Anthony T. Dougherty
(74) *Attorney, Agent, or Firm*—Finnegan, Henderson, Farabow, Garrett & Dunner, L.L.P.

(57) ABSTRACT

The sensor signals relating to the equipment are input from the sensors. The scalar distances of the recognition spaces of every combination of the sensor signals are computed. The flag signals of every combination of the sensor signals are outputted according to whether or not the scalar distances are included in the normal ranges of the recognition spaces. The failures of the equipment are determined according to the flag signals.

30 Claims, 17 Drawing Sheets

FIG.6

| CASE | F123 (s1, s2, s3) | F12 (s1, s2) | F13 (s1, s3) | F23 (s2, s3) | F1(s1) | F2(s2) | F3(s3) | P | s1 | s2 | s3 |
|---|---|---|---|---|---|---|---|---|---|---|---|
| 1 | 0 | 0 | 0 | 0 | 0 | 0 | 0 | 0 | 0 | 0 | 0 |
| 2 | 1 | 1 | 1 | 0 | 1 | 0 | 0 | 0 | 1 | 0 | 0 |
| 3 | 1 | 1 | 0 | 1 | 0 | 1 | 0 | 0 | 0 | 1 | 0 |
| 4 | 1 | 0 | 1 | 1 | 0 | 0 | 1 | 0 | 0 | 0 | 1 |
| 5 | 1 | 1 | 1 | 1 | 1 | 1 | 0 | 0 | 1 | 1 | 0 |
| 6 | 1 | 1 | 1 | 1 | 0 | 1 | 1 | 0 | 1 | 0 | 1 |
| 7 | 1 | 1 | 1 | 1 | 1 | 0 | 1 | 0 | 0 | 1 | 1 |
| 8 | 1 | 1 | 1 | 1 | 1 | 1 | 1 | 1 | - | - | - |

{ 81 : CASE column }
{ 82 : F123...F3(s3) columns }
{ 83 : P, s1, s2, s3 columns }

FIG.10

| TERM | T11 | T12 | T13 | T14 |
|------|-----|-----|-----|-----|
| F12  | 0   | 1   | 1   | 0   |
| F1   | 0   | 1   | 1   | 1   |
| F2   | 0   | 0   | 1   | 1   |
| s1   | 0   | 1   | -   | -   |
| s2   | 0   | 0   | -   | -   |
| PUMP | 0   | 0   | 1   | 1   |

FIG.11

| CASE | F12 | F13 | F23 | P | s1 | s2 | s3 |
|---|---|---|---|---|---|---|---|
| 11 | 0 | 0 | 0 | 0 | 0 | 0 | 0 |
| 12 | 1 | 1 | 0 | 0 | 1 | 0 | 0 |
| 13 | 1 | 0 | 1 | 0 | 0 | 1 | 0 |
| 14 | 0 | 1 | 1 | 0 | 0 | 0 | 1 |
| 15 | 1 | 1 | 1 | 1 | 0 | 0 | 0 |

FIG.12

| CASE | F123 | F123 | F134 | F234 | P | s1 | s2 | s3 | s4 |
|------|------|------|------|------|---|----|----|----|----|
| 21 | 0 | 0 | 0 | 0 | 0 | 0 | 0 | 0 | 0 |
| 22 | 1 | 1 | 1 | 0 | 0 | 1 | 0 | 0 | 0 |
| 23 | 1 | 1 | 0 | 1 | 0 | 0 | 1 | 0 | 0 |
| 24 | 1 | 0 | 1 | 1 | 0 | 0 | 0 | 1 | 0 |
| 25 | 0 | 1 | 1 | 1 | 0 | 0 | 0 | 0 | 1 |
| 26 | 1 | 1 | 1 | 1 | 1 | 0 | 0 | 0 | 0 |

81: CASE column
82: F123, F123, F134, F234 columns
83: P, s1, s2, s3, s4 columns

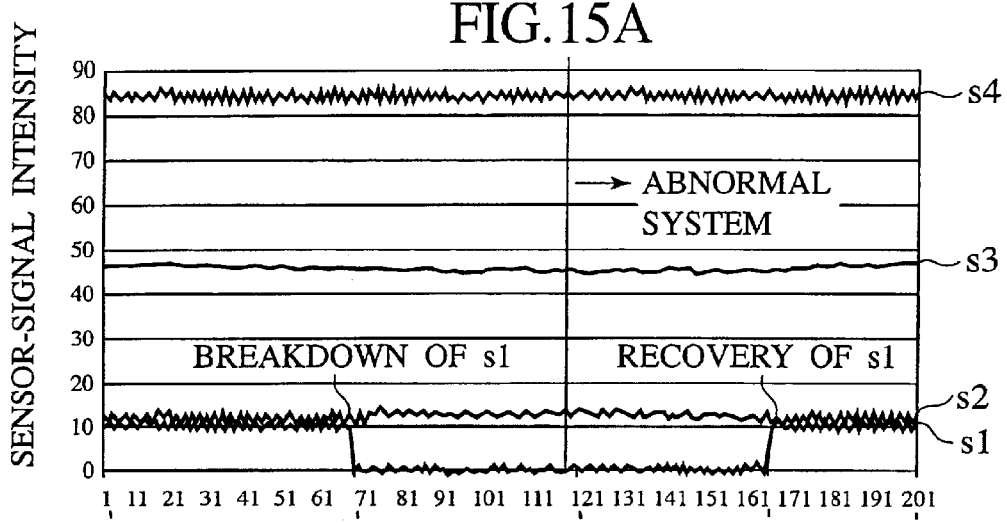
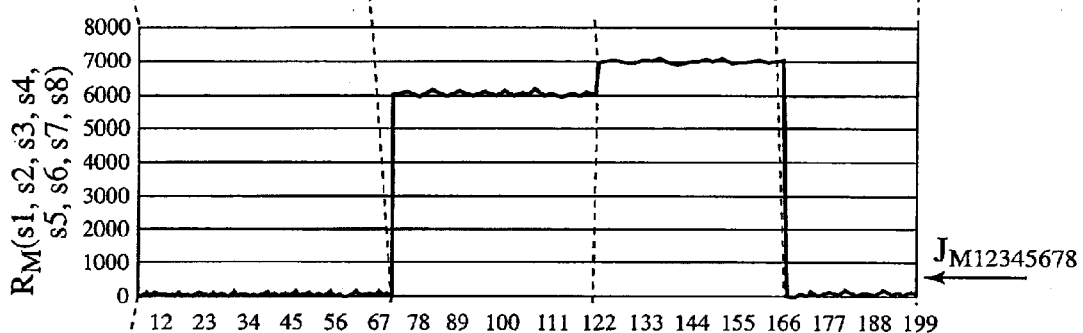
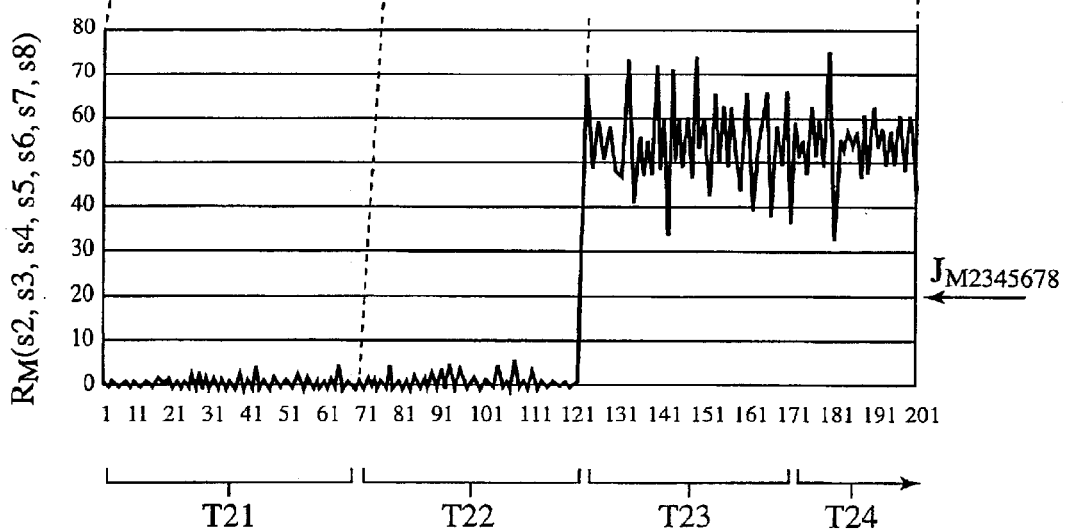

FIG.16

| TERM | T21 | T22 | T23 | T24 |
|---|---|---|---|---|
| $F_M$(s1, s2, s3 s4 s5, s6, s7, s8) | 0 | 1 | 1 | 0 |
| $F_M$(s2, s3, s4, s5, s6, s7, s8) | 0 | 0 | 1 | 1 |
| s1 | 0 | 1 | 1 | 0 |
| PUMP | 0 | 0 | 1 | 1 | ured
APPARATUS FOR DIAGNOSING FAILURE IN EQUIPMENT USING SIGNALS RELATING TO THE EQUIPMENT

CROSS REFERENCE TO RELATED APPLICATIONS

This application is based upon and claims the benefit of priority from prior Japanese Patent Application P2001-90585 filed on Mar. 27, 2001; the entire contents of which is incorporated by reference herein.

BACKGROUND OF THE INVENTION

The present invention relates to a diagnostic apparatus for detecting a failure in an equipment with sensors and a failure in the sensors by multivariate-analyzing signals of the sensors.

In a semiconductor-device fabrication system, defect diagnostics is performed. In the case of the defect diagnostics, a plurality of signals for current, voltage, power, temperature, volume of exhaust gas, and sound vibration are observed. These signals are statistically analyzed. Information effective for the defect diagnostics of the fabrication system is obtained from the analysis.

In one or more of the many sensors, while not a failure such as disconnection, failures with sensitivity may occur. A signal outputted from a sensor in which a failure occurs shows an abnormal value. According to the abnormal value, the diagnostic result of the fabrication system shows that a failure has been detected.

However, because the fabrication system is not actually faulty, the above diagnostic is an erroneous diagnostic. The frequency of failures in the sensitivity of a sensor is greater than the frequency of failures in the fabrication system. Therefore, to improve the reliability of failure diagnoses, it is necessary to improve the detection accuracy and the stability of the sensor.

When the sensitivity of the sensor is abnormal, it takes a lot of time to find the sensor having the abnormal sensitivity. In this case, the fabrication system is not being operated though it is normal. Therefore, a loss may occur because the system is not being operated.

SUMMARY OF THE INVENTION

A diagnostic apparatus according to embodiments of the present invention includes: an inputting section inputting sensor signals about an equipment from sensors; an operating section computing scalar distances in recognition spaces of combinations of the sensor signals; a flag signal outputting section outputting flag signals of the combinations according to whether the scalar distances are included in normal ranges of the recognition spaces of the combinations; and a determining section determining a failure of the equipment by the flag signals.

A diagnostic method according to embodiments of the present invention includes: inputting sensor signals about an equipment from sensors; computing scalar distances of recognition spaces of combinations of the sensor signals; outputting flag signals of the combinations according to whether the scalar distances are included in normal ranges of the recognition spaces of the combinations; and determining a failure in the equipment according to the flag signals.

A computer integrated manufacturing (CIM) system according to embodiments of the present invention includes: an equipment; sensors outputting sensor signals about the equipment; an inputting section inputting the sensor signals; an operating section computing scalar distances in recognition spaces of combinations of the sensor signals; a flag signal outputting section outputting flag signals of the combinations according to whether the scalar distances are included in normal ranges of the recognition spaces of the combinations; and a determining section determining a failure of the equipment by the flag signals.

BRIEF DESCRIPTION OF THE DRAWINGS

FIG. 6 is determination data of the failure diagnostic apparatus of the first embodiment;

FIG. 10 is a table for explaining diagnostic results when diagnosing with the failure diagnostic apparatus of the second embodiment;

FIG. 11 is determination data of a failure diagnostic apparatus of third embodiment;

FIG. 12 is determination data of a failure diagnostic apparatus of fourth embodiment;

FIGS. 15A to 15C are illustrations for explaining signal-processing flows of a diagnostic method used with diagnosing with a failure diagnostic apparatus of sixth embodiment;

FIG. 16 is a table for explaining diagnostic results when diagnosing with the failure diagnostic apparatus of the sixth embodiment.

DETAILED DESCRIPTION OF EMBODIMENTS

Various embodiments of the present invention will be described with reference to the accompanying drawings. It (First Embodiment)

Figure 1:
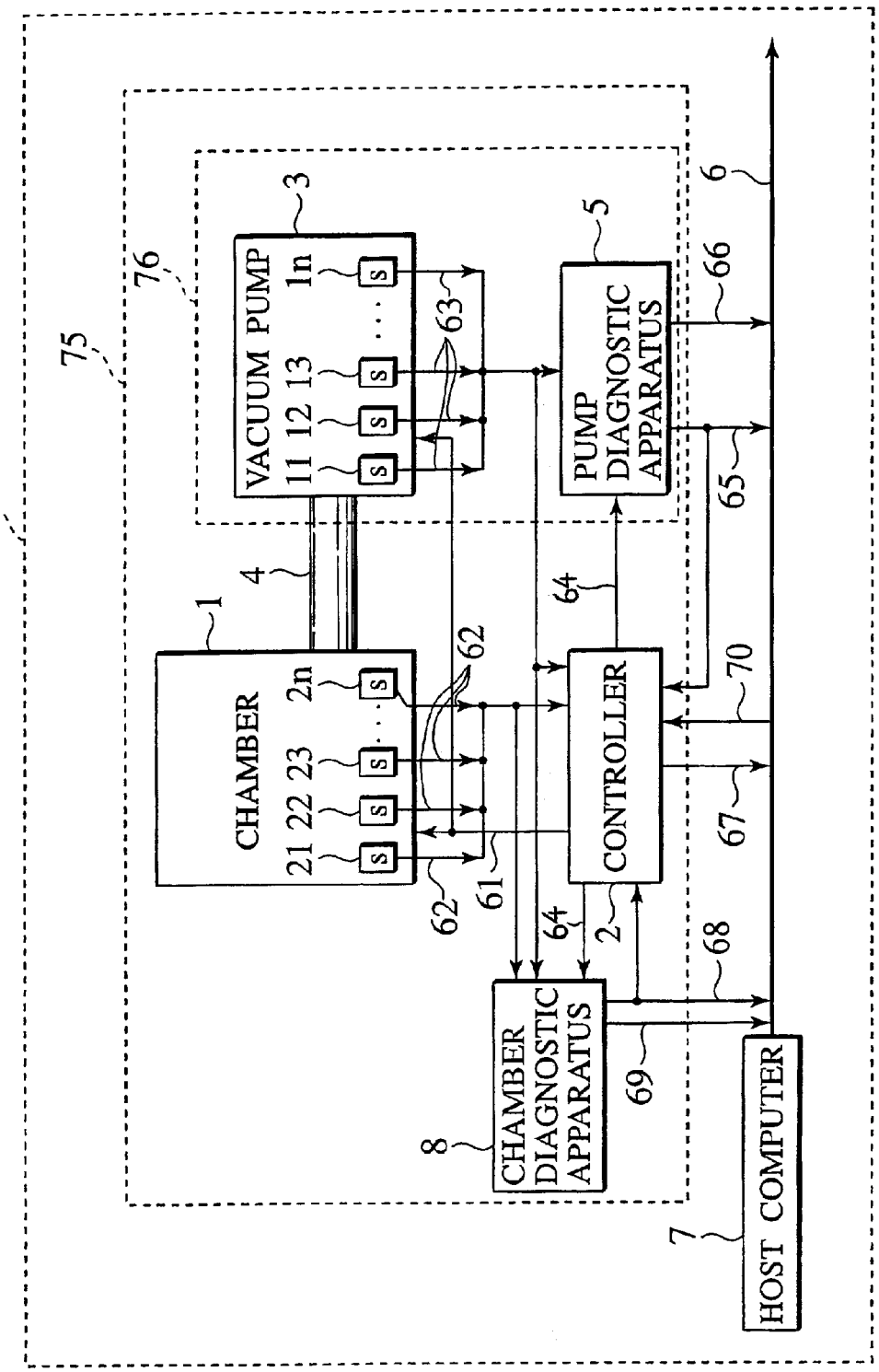
FIG. 1 is a block diagram of a CIM system having a failure diagnostic apparatus of first embodiment, a vacuum evacuating unit, and a lot processor.

As shown in FIG. 1, a CIM system 78 has a host computer 7, a lot processor 75 and a local area network (LAN) 6 mutually connecting the lot processor 75 and host computer 7. The lot processor 75 has a chamber 1, a controller 2, a chamber diagnostic apparatus 8 and a vacuum evacuating unit 76. The chamber 1 can fabricate a semiconductor device and has chamber sensors 21 to 2n. The controller 2 controls the chamber 1. The chamber diagnostic apparatus 8 diagnoses the failures in the chamber 1 and the chamber sensors 21 to 2n. The vacuum evacuating unit 76 has a vacuum pump 3 for evacuating the chamber 1 and a pump diagnostic apparatus 5 for diagnosing a failure in the vacuum pump 3. The pump sensors 11 to 1n are arranged in the vacuum pump 3. The pump diagnostic apparatus 5 can detect failures in the pump sensors 11 to 1n. The pump diagnostic apparatus 5 diagnoses the failures in the vacuum pump 3 and the pump sensors 11 to 1n. A pipe 4 is connected between the chamber 1 and the vacuum pump 3 for evacuating.

The pump sensors 11 to 1n and the chamber sensors 21 to 2n detect current, voltage, power, temperature, volume of exhaust gas, sound vibration, acceleration, and gas flow rate as barometers of the states of the chamber and the pump.

Moreover, the chamber sensors 21 to 2n output sensor signals 62 having inner-chamber-information to a controller 2 and the chamber diagnostic apparatus 8. The controller 2 outputs a control signal 61 to the chamber 1 and the vacuum pump 3. The pump sensors 11 to 1n output a sensor signal 63 about the information of the vacuum pump 3 to the controller 2 and the pump diagnostic apparatus 5 and the chamber diagnostic apparatus 8. The controller 2 transmits the lot processing information 67 about a lot processing state of the chamber 1 to the host computer 7 through the LAN 6. The controller 2 outputs a process signal 64 about a processing state of the chamber 1 capable of determining a diagnostic timing to the pump diagnostic apparatus 5 and the chamber diagnostic apparatus 8. The pump diagnostic apparatus 5 transmits the failure information 65 showing that the vacuum pump 3 is faulty to the controller 2 and the host computer 7 through the LAN 6. The pump diagnostic apparatus 5 transmits the failure information 66 showing that the pump sensors 11 to 1n are abnormally sensitive to the host computer 7. It is allowable to directly display the failure information 65 and 66 on the display unit.

The chamber diagnostic apparatus 8 transmits the information 68 showing that the chamber 1 is faulty to the controller 2 and host computer 7. The chamber diagnostic apparatus 8 transmits the information 69 showing that the chamber sensors 21 to 2n are abnormally sensitive to the host computer 7. It is possible to control and maintain the lot processing of semiconductor devices and a lot processor 75.

Figure 2:
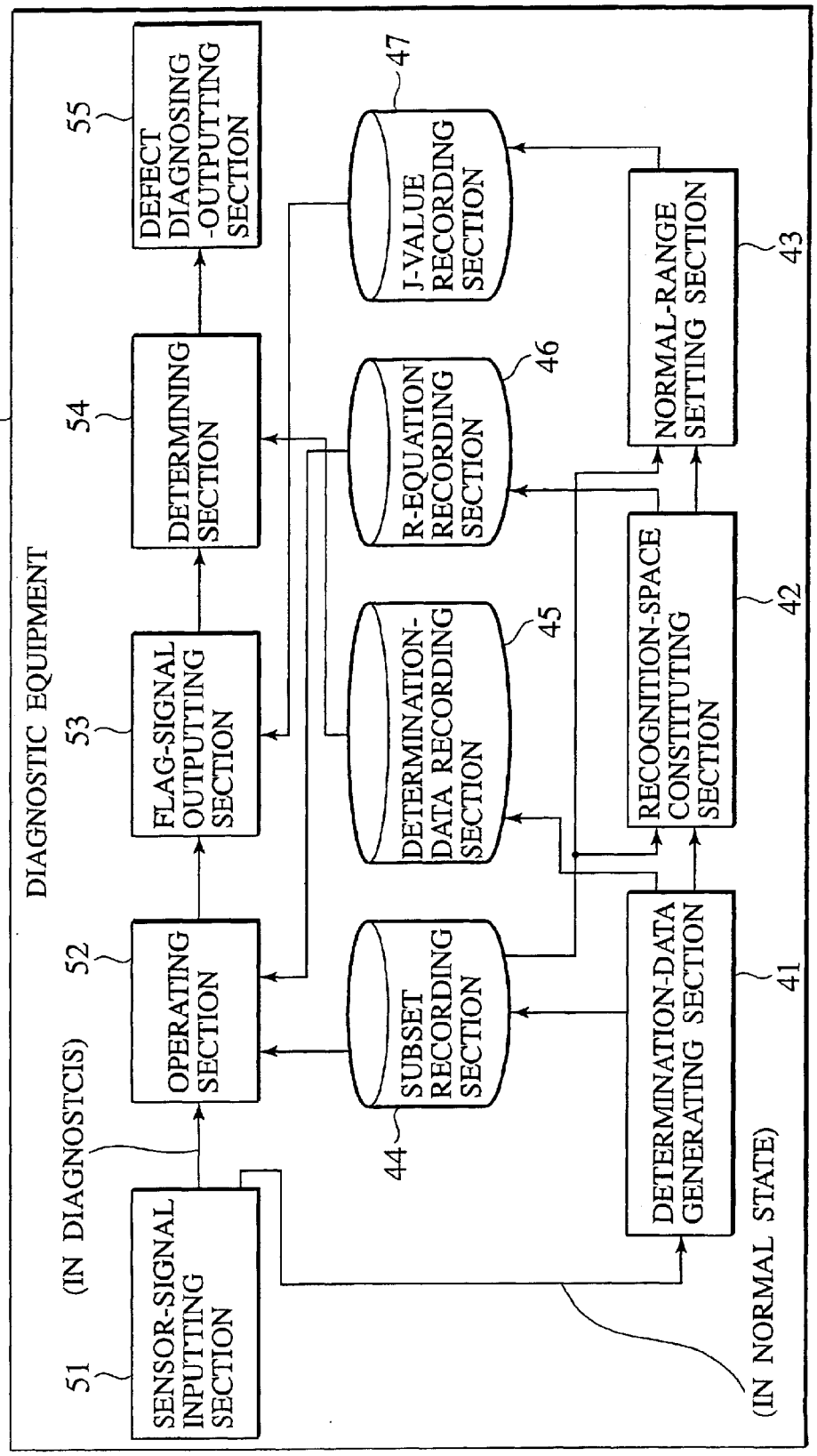
FIG. 2 is a block diagram of the failure diagnostic apparatus of the first embodiment.

As shown in FIG. 2, the pump diagnostic apparatus 5 has a sensor-signal inputting section 51, an operating section 52, a flag-signal outputting section 53, a determining section 54, a defect diagnosing-outputting section 55, a determination-data generating section 41, a recognition-space constituting section 42, a normal-range setting section 43, a subset recording section 44, a determination-data recording section 45, a R-equation recording section 46, and a J-value recording section 47. In addition, the chamber diagnostic apparatus 8 has the same configuration as the pump diagnostic apparatus 5.

The sensor-signal inputting section 51 inputs the sensor signals 63 from the pump sensors 11 to 1n about the vacuum pump 3.

The operating section 52 computes a scalar distance of a recognition space D306 of every combination of the sensor signals 63. The recognition space D306 can be a Mahalanobis space. It is allowable that the scalar distance 308 is the Mahalanobis-Taguchi distance.

The flag-signal outputting section 53 compares the scalar distance computed by the operating section 52 with a predetermined reference value (J value). The flag-signal outputting section 53 obtains a flag signal showing whether or not the scalar distance is normal. The flag-signal outputting section 53 determines whether or not the scalar distance is included in the normal range of the recognition space of every combination of the sensor signals.

The determining section 54 logic-analyzes the obtained flag signals to determine whether or not the vacuum pump 3 is faulty and the pump sensors 11 to 1n are abnormal. The determining section 54 determines whether or not an abnormal sensor is present among the pump sensors 11 to 1n according to the obtained flag signal. The determining section 54 determines whether or not a failure has occurred in the vacuum pump 3. The determining section 54 determines according to determination data D305.

The defect diagnosing-outputting section 55 outputs the information showing whether or not the vacuum pump 3 is faulty and the pump sensors 11 to 1n are abnormal to the host computer 7.

The determination-data generating section 41 generates a plurality of the combinations D304 of the sensor signals 63 when the vacuum pump 3 is operating normally. The determination-data generating section 41 generates the determination data D305 capable of determining a failure in the vacuum pump 3 according to the flag signals of every combination D304 of the sensor signals 63 when the vacuum pump 3 is operating normally. According to the determination data D305, it is possible to determine the failure in the pump sensors 11 to 1n using the flag signals of every combination D304 of the sensor signals 63. The determination data D305 has a collative area in which a case of the flag signals of every combination D304 of the sensor signals 63 is recorded and the case can be collated. The determination data D305 has a state area in which a state of the vacuum pump 3 related to the case is recorded. The combination D304 is constituted by the universal set of all sensor signals 63 of all pump sensors 11 to 1n inputted by the inputting section 51 and all subsets of the universal set. It is not always necessary that a combination D304 is constituted by the universal set and all subsets. It is allowable that a combination is not constituted by the universal set or by some of the subsets. A generated combination D304 is recorded in a subset recording section 44 so as to be readable anytime. A generated determination data D305 is recorded at determination data recording section 45 so as to be readable anytime.

The recognition-space constituting section 42 constitutes a recognition space D306 of every combination D304 of the sensor signals 63 according to the sensor signals 63 input when the vacuum pump 3 is operating normally. The recognition space D306 can be expressed as a R equation D306. The constituted recognition space D306 is recorded in the R-equation recording section 46 so that it can be read anytime.

The normal-range setting section 43 sets a normal range D307 of the recognition space D306 when the vacuum pump 3 is operating normally according to a variance a of the recognition space D306 of every combination D304 of the sensor signals 63. The normal range D307 can be expressed as a J value. The set normal range D307 is recorded in the J-value recording section 47 so that it can be read anytime.

Then, a diagnostic method of the pump diagnostic apparatus 5 of the first embodiment is described. The diagnostic method is divided into a diagnostic method in a normal state which is a preparatory action of a diagnostic and the so-called diagnostic method in diagnostic.

First, the diagnostic method in the normal state is described below. In the case of the diagnostic method in the normal state, the sensor-signal inputting section 51 inputs the sensor signals s1, s2, and s3 (63) about the pump 3 from the pump sensors 11 to 13 when the pump 3 and the pump sensors 11 to 13 normally operate as the action S301 in FIG. 3.

As the action S302, the determination-data generating section 41 generates a plurality of the combinations (subsets) (s1, s2, s3), (s1, s2), (s1, s3), (s2, s3), (s1), (s2), (s3) D304 according to the sensor signals s1, s2, s3 (63). The determination-data generating section 41 generates a universal set (s1, s2, s3) and all subsets (s1, s2) (s1, s3) (s2, s3) (s1) (s2) (s3) D304. The determination-data generating section 41 generates the determination data D305 capable of determining a failure in the pump 3 according to a plurality of the flag signals F123, F12, F13, F23, F1, F2, and F3 of every combination (s1, s2, s3) (s1, s2) (s1, s3) (s2, s3) (s1) (s2) (s3) D304 of the sensor signals s1, s2, s3 (63).

The determination data D305 has a case area 81, a collative area 82 and a state area 83 as shown in FIG. 6. The flag signals F123, F12, F13, F23, F1, F2, and F3 of every combination D304 of the sensor signals 63 are recorded in the collative area 82 related to every case 1 to 8 in the case area 81. The flag signals F123, F12, F13, F23, F1, F2 and F3 are collated in every case 1 to 8. In the state area 83, the states of the pump 3 and the pump sensors 11 to 13 are related to the cases 1 to 8.

Figure 7:
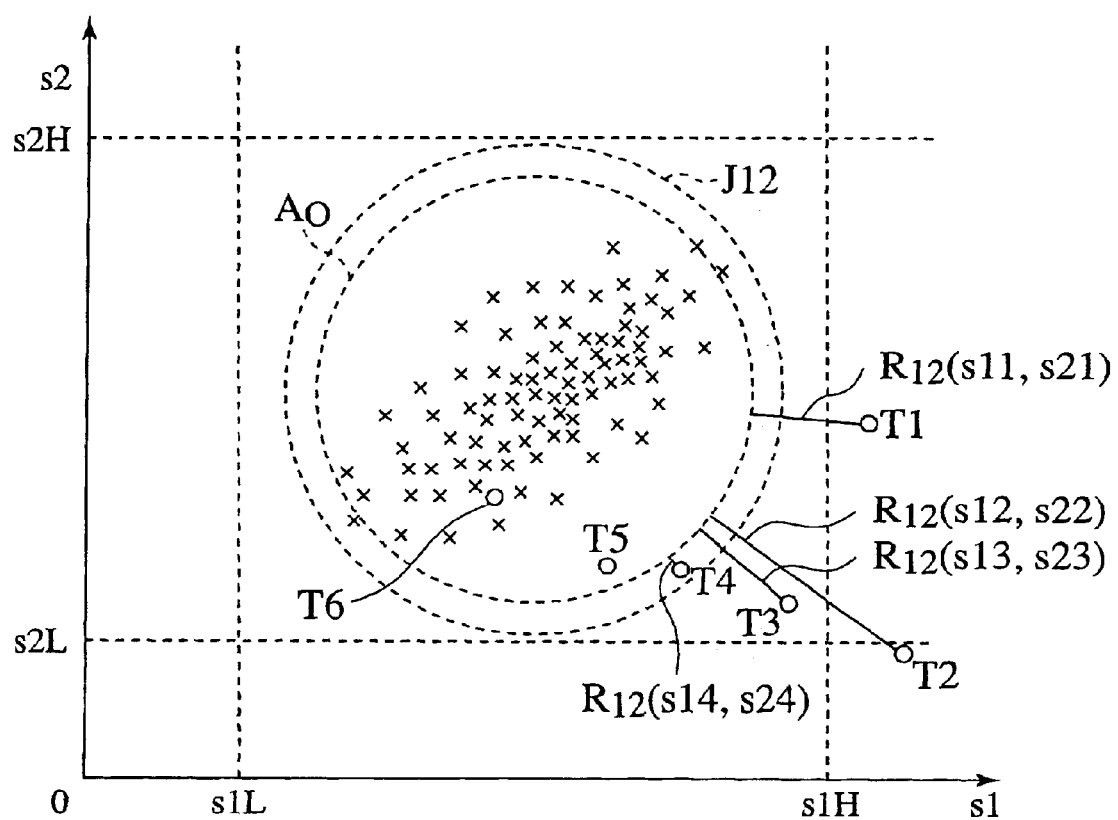
FIG. 7 is a conceptual illustration of a recognition space, normal range, and scalar length of a subset (S1, S2) of the failure diagnostic apparatus of the first embodiment.

As the action S303, the recognition-space constituting section 42 constitutes the recognition spaces D306 of every combination (s1, s2, s3) (s1, s2) (s1, s3) (s2, s3)(s1)(s2)(s3) D304 according to the sensor signals s1, s2, and s3 (63) inputted in the normal state. The recognition space A0 (D306) of the combination (s1, s2) D304 can be considered as the circle on the plane of coordinates containing the rectangular coordinate axes s1 and s2 as shown in FIG. 7. The marks x denote points obtained by plotting values of the sensor signals s1 and s2 (63) inputted every hour in the normal state. The recognition space A0 (D306) is set so as to include the marks x. Specifically, the recognition-space constituting section 42 sets the coefficients of the R-equation D306 showing the recognition space A0.

Figure 3:
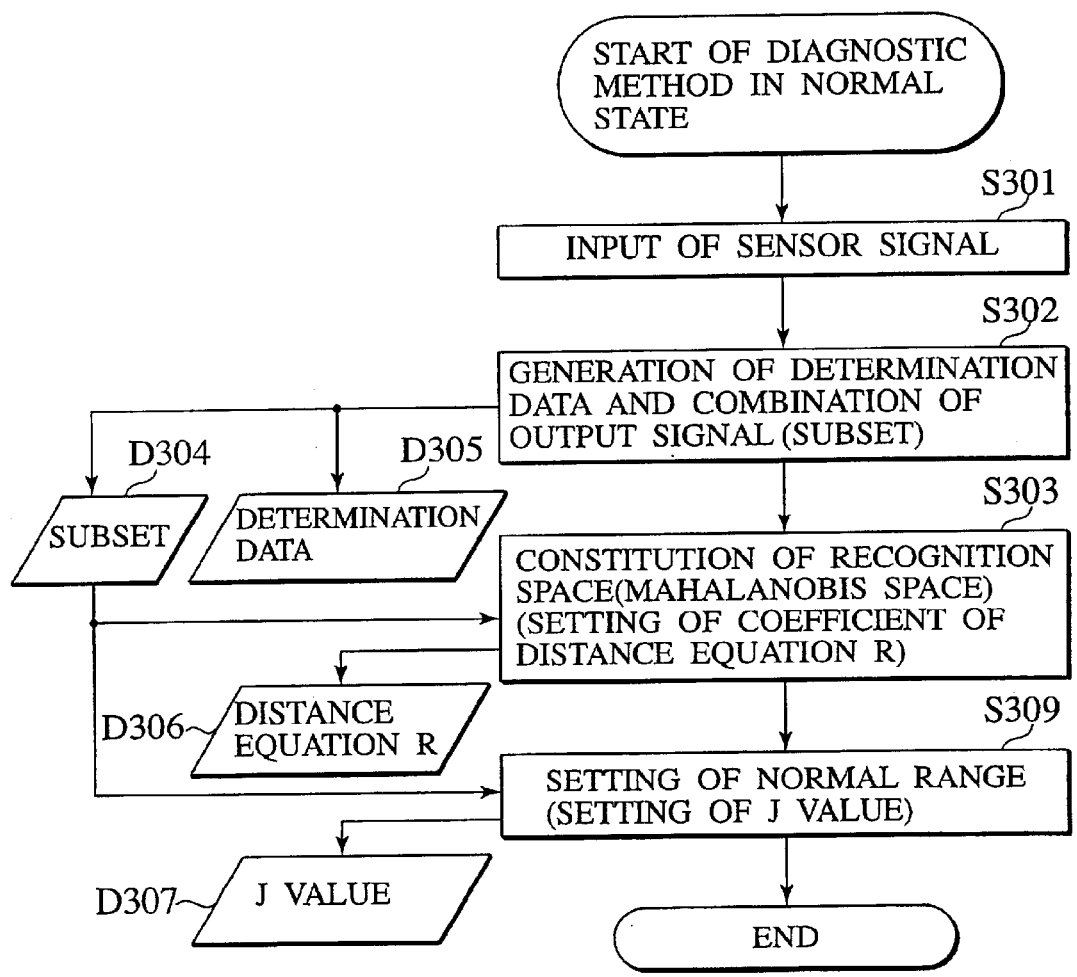
FIG. 3 is a flowchart of a diagnostic method of the failure diagnostic apparatus of the first embodiment in a normal state.

As the action S309 in FIG. 3, the normal-range setting section 43 sets the normal range J12 of the recognition space A0 (D306) of the combination (s1, s2) D304 according to the variance σ of the marks x in the recognition space A0 (D306). Specifically, the J-value J12 (D307) serving as the criterion of the magnitude of the R-equation D306 is set.

Figure 4:
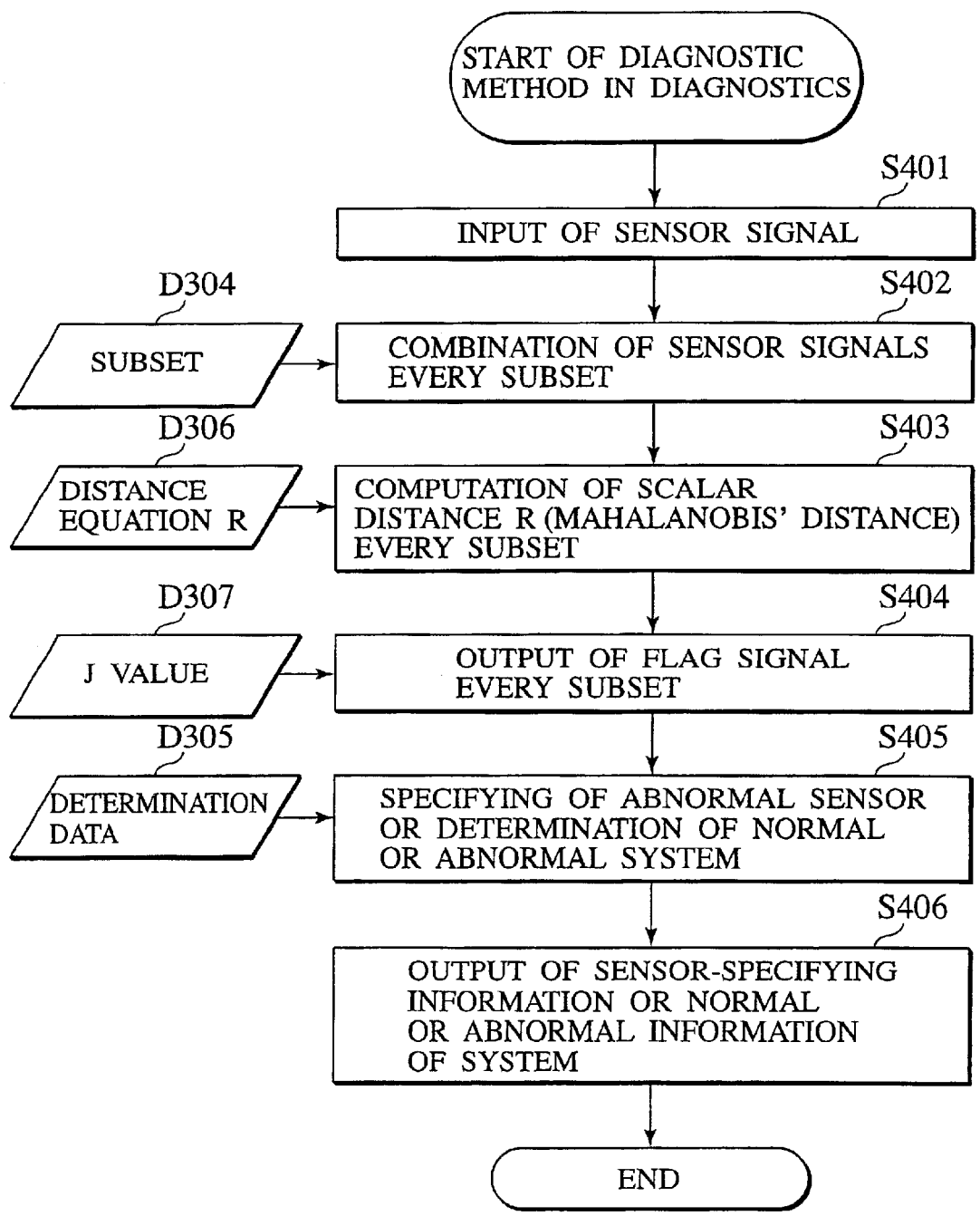
FIG. 4 is a flowchart of a diagnostic method used when diagnosing with the failure diagnostic apparatus of the first embodiment.
Figure 5:
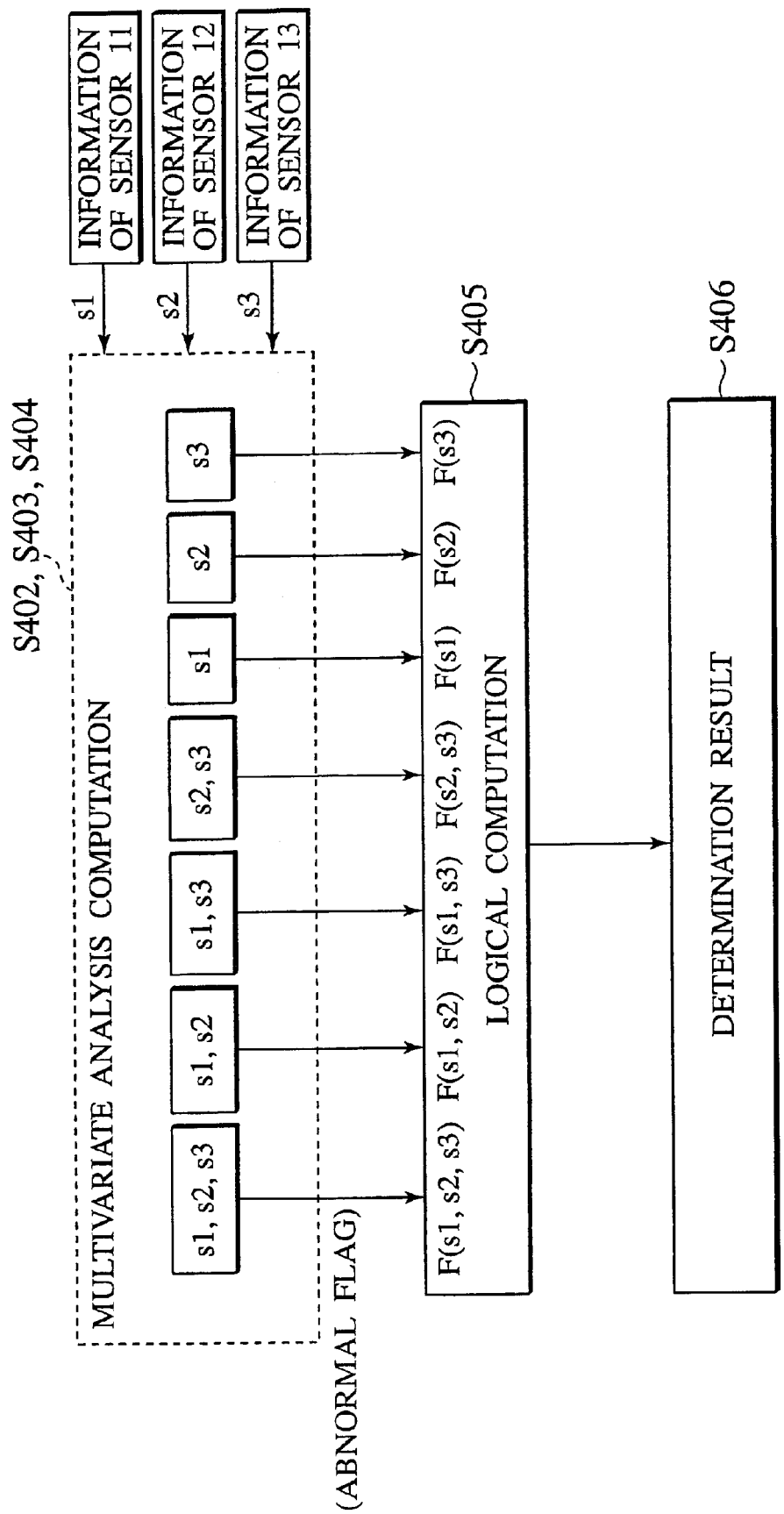
FIG. 5 is an illustration for explaining a signal-processing flow when diagnosing with the failure diagnostic apparatus of the first embodiment.
Figure 8:
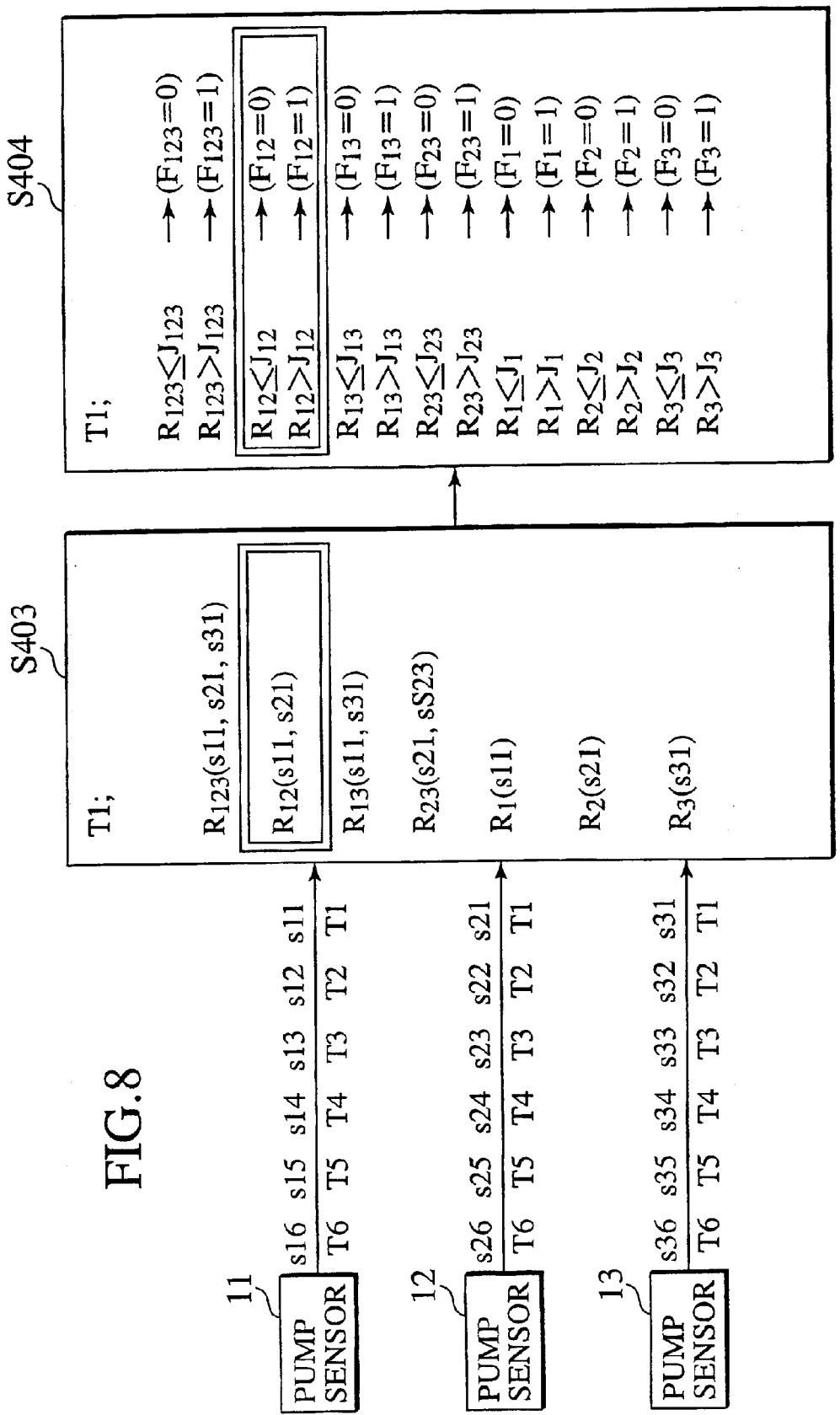
FIG. 8 is an illustration showing a detailed signal-processing flow of a diagnostic method used when diagnosing with the failure diagnostic apparatus of the first embodiment.

In the diagnostic method in the diagnostic, the sensor-signal inputting section 51 inputs the sensor signals s1, s2, and s3 as the action S401 in FIG. 4 as shown in FIG. 5. The sensor-signal inputting section 51 inputs the sensor signals s11, s21, and s31 at the timing T1 from the pump sensors 11 to 13 as shown in FIG. 8. The sensor-signal inputting section 51 successively inputs the sensor signals s12 to s16, s22 to s26, and s32 to s36 at the timings T2 to T6 from the pump sensors 11 to 13.

As the action S402, the operating section 52 combines the sensor signals s1, s2, and s3 every subsets (s1, s2, s3), (s1, s2), (s1, s3), (s2, s3), (s1), (s2), (s3) D304 as shown in FIG. 5. The operating section 52 combines the sensor signals s11, s21, and s31 (63) at the timing T1 every subsets (s1, s2, s3), (s1, s2), (s1, s3), (s2, s3),(s1), (s2), (s3) D304. It is also possible to process the sensor signals s12 to s16, s22 to s26, and s32 to s36 (63) at other times T2 to T6 similarly to the case of the sensor signals s11, s21, and s31 (63) at the timing T1. The operating section 52 generates the subsets (s11, s21, s31), (s11, s21), (s11, s31), (s21, s31), (s11), (s21), (S31) D304. As an action S403, the operating section 52 computes scalar distances R123(s11, s21, 31), R12(s11, s21), R13(s11, s31), R23(s21, s31), R1(s11), R2(s21), and R3(s31) D306 as shown in FIG. 8. Specifically, the corresponding sensor signals 63 are substituted for the distance equations R (D306) of every subset D304.

As shown in FIG. 7, the scalar distance R12(s11, s21) is computed according to the pump sensor signals s11 and s21 inputted at the timing T1. The scalar distance R12(s12, s22) is computed according to the pump sensor signals s12 and s22 inputted at the timing T2. The scalar distance R12(s13, s23) is computed according to the pump sensor signals s13 and s23 inputted at the timing T3. The scalar distance R12(s14, s24) is computed according to the pump sensor signals s14 and s24 inputted at the timing T4. The scalar distance R12(s15, s25) is computed according to the pump sensor signals s15 and s25 inputted at the timing T5. The scalar distance R12(s16, s26) is computed according to the pump sensor signals s16 and s26 input at the timing T6.

As the action S404, the flag-signal outputting section 53 determines whether or not the scalar distances R123(s11, s21, s31), R12(s11, s21), R13(s11, s31), R23(s21, s31), R1(s11), R2(s21), and R3(s31) 308 are included in the normal ranges J123, J12, J13, J23, J1, J2, and J3 of the recognition space A0 of every combination (s11, s21, s31), (s11, s21), (s11, s31), (s21, s31), (s11), (s21), and (s31) D304 of the sensor signals s11, s21, s31 (63). Specifically, the flag-signal outputting section 53 determines whether or not values of the corresponding scalar distances R123(s11, s21, s31), R12(s11, s21), R13(s11, s31), R23(s21, s31), R1(s11), R2(s21), and R3(s31) D306 are smaller than J values D307 of normal ranges J123, J12, J13, J23, J1, J2, and J3. The flag-signal outputting section 53 outputs the flag signals F123, F12, F13, F23, F1, F2, and F3 (80) every the combination (s11, s21, s31), (s11, s21), (s11, s31), (s21, s31), (s11), (s21), and (s31) D304 according to the above determination.

As shown in FIG. 7, the scalar distance R12(s11, s21) at the timing T1 is larger than in the normal range J12. The flag signal F12 is 1 (abnormal). The scalar distance R12(s12, s22) at the timing T2 is larger than in the normal range J12. The flag signal F12 is 1 (abnormal). The scalar distance R12(s13, s23) at the timing T3 is larger than in the normal range J12. The flag signal F12 is 1 (abnormal). The scalar distance R12(s14, s24) at the timing T4 is smaller than in the normal range J12. The flag signal F12 is 0 (normal). The scalar distance R12(s15, s25) at the timing T5 is smaller than in the normal range J12. The flag signal F12 is 0 (normal). The scalar distance R12(s16, s26) at the timing T6 is smaller than in the normal range J12. The flag signal F12 is 0 (normal).

As the action S405, the determining section 54 determines the failure in the pump 3 according to the flag signals F123, F12, F13, F23, F1, F2, and F3. The determining section 54 specified by an abnormal pump sensor of the pump sensors 11 to 13. The determining section 54 determines whether the pump 3 is normal according to the determination data D305 in FIG. 6.

It is allowable that the determining section 54 logic-analyzes the flag signals F123, F12, F13, F23, F1, F2, and F3 (80) of every obtained subsets as shown in FIG. 5. As shown in FIG. 6, all flag signals F123, F12, F13, F23, F1, F2, and F3 in the case 1 are equal to 0. The determination 0 is outputted which shows that the vacuum pump 3 (P) and all pump sensors 11, 12, and 13 are normal.

In the case 2, the flag signals F123, F12, F13, and F1 are equal to 1. The flag signals F23, F2, and F3 are 0. The determination 0 is outputted which shows that the vacuum pump 3 and the sensors 12 and 13 are normal. The determination 1 is outputted which shows that the pump sensor 11 is abnormal.

In the case 8, all flag signals F123, F12, F13, F23, F1, F2, and F3 (80) are 1. The determination 1 is outputted which shows that the vacuum pump 3 (P) is abnormal. This is because it is very rare that all pump sensors 11 (s1), 12 (s2), and 13 (s3) become abnormal at the same time.

In the case 5, F123, F12, F13, F23, and F2 are 1. Only F3 is 0. The determination 0 is outputted which shows that the vacuum pump 3 and sensor 13 are normal. The determination 1 is outputted which shows that the pump sensors 11 and 12 are abnormal. Because most flag signals are 1 (abnormal), determination accuracy may be low. It is also allowable to issue a warning message as a determination of the pump 3. Thereby, an operator has an additional opportunity to determine a failure in the pump 3. Depending on a logic analysis, a determination-information accuracy is output as a warning message. As shown in FIG. 6, the cases 5 to 7 show that two of the pump sensors 11 to 13 are simultaneously abnormal. Because this case is very rare, it is estimated that the above case is caused by a failure in the pump 3. This is outputted as a warning message.

Moreover, a case in which F123, F12, F13, F23, F1, and F2 are 0 and F3 is 1 is logically not present. In this case, an error message is output which shows that it is determined that the pump diagnostic apparatus 5 is abnormal. Moreover, when performing the determination using only the flag signals F12, F13, and F23 using all sensors except one sensor, it is possible to avoid a complex determination logic.

As an action S406, the defect diagnostics-outputting section 55 outputs a determination result of a failure in the pump 3. The defect diagnosing-outputting section 55 outputs the information for specifying an abnormal sensor. The defect diagnosing-outputting section 55 outputs the information showing whether the pump 3 is normal or abnormal.

The state of the vacuum pump 3 is changed according to the state of the chamber 1 such as temperature or gas flow rate. Because current, voltage, power, temperature, volume of exhaust gas, sound vibration, and acceleration of the pump sensors 11 to in indirectly express the state of the vacuum pump 3. Therefore, to detect a failure in the vacuum pump 3 and the pump sensors 11 to 1n, it is necessary that the pump diagnostic apparatus 5 recognizes the process information 64 of the chamber 1 through the controller 2.

The sensor signals s1, s2, and s3 of three pump sensors 11, 12, and 13 are handled. (s1, s2, s3) denotes that computation is performed using all the sensor signals s1, s2, and s3 of the pump sensors 11, 12, and 13. (s1, s2) denotes that computation is performed using sensor signals s1 and s2 of the pump sensors 11 and 12. The same is applied to (s2, s3), (s1, s3), (s1), (s2), and (s3). The multivariate analysis computations of actions S402 to S404 in FIGS. 4 and 5 are performed using all pieces of the information of the pump sensors 11 to 13 to output results of determining computed values. The scalar distance R123(s1, s2, s3) is shown by the following equation 1.

$$R123(s1, s2, s3)=(a1231*s1*s1+a1232*s2*s2+a1233*s3*s3)/M123 \quad (1)$$

In the above equation 1, the s1, s2, and s3 are values of the sensor signals and change each moment. The coefficients of a1231 to a1233 and M123 are constants. In the normal state, the value of the scalar distance R123(s1, s2, s3) becomes approximately 1. The scalar distance R123(s1, s2, s3) is a scalar value. The multivariate analysis computations in the actions S402 to S404 extract scalar values R123(s1, s2, s3) from the values s1, s2, and s3.

The normal range J123 serves as a criterion of the scalar distance R123(s1, s2, s3). The value of the normal range J123 is decided by considering the fluctuation of values of sensor signals s1 to s3 in the normal state. The value of the normal range J123 is equal to the value to be reached when the scalar distance R123(s1, s2, s3) exceeds 3σ of the fluctuation in the normal state.

If the scalar distance R123(s1, s2, s3) is equal to or less than the normal range J123, and the flag signal F123 is 0 (F123=0). If the scalar distance R123(s11, s21, s31) is larger than the normal range J123, and the flag signal F123 is equal to 1 (F123=1).

In this case, the fact that F123 is 1 only shows that the analysis result when using the information from the pump sensor 11 to 13 is not a normal value. In this case, it is shown that the vacuum pump 3 is abnormal or a sensor is abnormal and it is impossible to determine which is abnormal at that moment.

The values of F12, F13, F23, F1, F2, and F3 are decided using the same procedure. In this case, F12 is obtained from the sensor signals s1 and s2. Moreover, F1 is obtained using only the sensor signal s1. The scalar distance R12(s1, s2) is shown by the following equation 2.

$$R12(s1, s2)=(a121*s1*s1+a122*s2*s2)/M12 \quad (2)$$

In the above equation 2, the coefficients of a121 and a122 and M12 are constants. In the normal state, the value of the scalar distance R12(s1, s2) becomes approximately 1.

If the scalar distance R12(s1, s2) is equal to or less than the normal range J12, the flag signal 12 is 0 (F12=0). If the scalar distance R12(s1, s2) is larger than the normal range J12, the flag signal F12 is equal to 1 (F12=1). The same is applied to the case of the scalar distances R13(s1, s3) and R23(s2, s3).

The scalar distance R1(s1) is shown by the following equation 3.

$$R1(s1)=(a11*s1*s1)/M1 \quad (3)$$

In the above equation 3, the coefficients of a11 and M1 are constants. In the case of the sensor signal s1 in a the normal state, the value of the scalar distance R1(s1) becomes approximately 1.

If the scalar distance R1(s1) is equal to or less than the normal range J1 (R1(s1) is equal to or less than J1), the flag signal F1 is 0 (F1=0). If the scalar distance R1(s1) is larger than the normal range J1 (R1(s1) is larger than J1), the flag signal F1 is 1 (F1=1). The same is applied to the case of scalar distances R2(s2) and R3(s3).

The pump diagnostic apparatus 5 of the first embodiment does not use a redundant sensor or a collateral circuit of a redundant sensor. The pump diagnostic apparatus 5 realizes a diagnostic by a simple configuration using a sensor having a normal sensitivity.

The pump diagnostic apparatus 5 can use the different types such as current, voltage, power, temperature, volume of exhaust gas, sound vibration, and acceleration of the sensors 11 to 13. By using the different types of the sensors 11 to 13, it is possible to improve the detection sensitivity of the abnormal sensor. Moreover, it is possible to improve the reliability of the sensor signals s1 to s3 of the pump sensors 11 to 1n. The following explains why the pump diagnostic apparatus 5 can improve the sensor detection sensitivity. As shown in FIG. 7, the normal range of the pump sensor signal s1 generally is between a lower limit s1L and an upper limit s1H. Similarly, the normal range of the sensor signal s2 is between the lower limit s2L and the upper limit s2H. Thus, it is possible to generally determine that the pump sensor signals s1 and s2 are normal at the timing T3. According to the pump diagnostic apparatus 5, it is possible to determine that the scalar distance R12 of the pump sensor signals s1 and s2 is abnormal at the timing T3.

In the earlier detection of the failures in the pump sensors 11 to 13, it is need to prepare the same type of the pump sensors. According to the pump diagnostic apparatus 5, it is possible to detect the failure in the pump sensors 11 to 13 of the different types such as current, voltage, power, temperature, volume of exhaust gas, sound vibration, and acceleration. The same type of the redundant sensors are unnecessary.

The pump diagnostic apparatus 5 can instantaneously determine the sensor failures. There is almost no time to stop the pump 3 and the lot processor 75 for detecting an abnormal sensor. Moreover, because the pump diagnostic apparatus 5 can determine the failure of the pump sensors, it is possible to accurately determine whether or not the vacuum pump 3 is normal. The pump diagnostic apparatus 5 makes it possible to extremely improve reliability of defect diagnostics and service-life diagnostic of the pump 5 or the lot processor 75.

The pump 3 or the lot processor 75 may be operated in continuous repetition. It is allowable to diagnose a failure of the lot processor 75 and sensors in a standby state between operations. If sensor failure is detected in the above state, it is possible to repair a sensor without stopping the processor. When no sensor failure is detected, it is possible to improve the reliability of the diagnostic of the lot processor 75.

Moreover, as shown in FIG. 1, the pump diagnostic apparatus 5 is independently constituted. It is allowable that the pump diagnostic apparatus 5 is built into the controller 2 of the lot processor 75. Moreover, it is allowable that the pump diagnostic apparatus 5 is built into the controller of the vacuum pump 3.

The pump diagnostic apparatus 5 is described using the pump sensors 11 to 13 of the vacuum pump 3 used in the lot processor 75. The pump diagnostic apparatus 5 can be generally used for failure diagnostic, deterioration diagnostic, and service-life estimation of an equipment using multilateral sensors. The pump diagnostic apparatus 5 can be applied to any equipment, plant, and aircraft.

(Second Embodiment)

Figure 9:
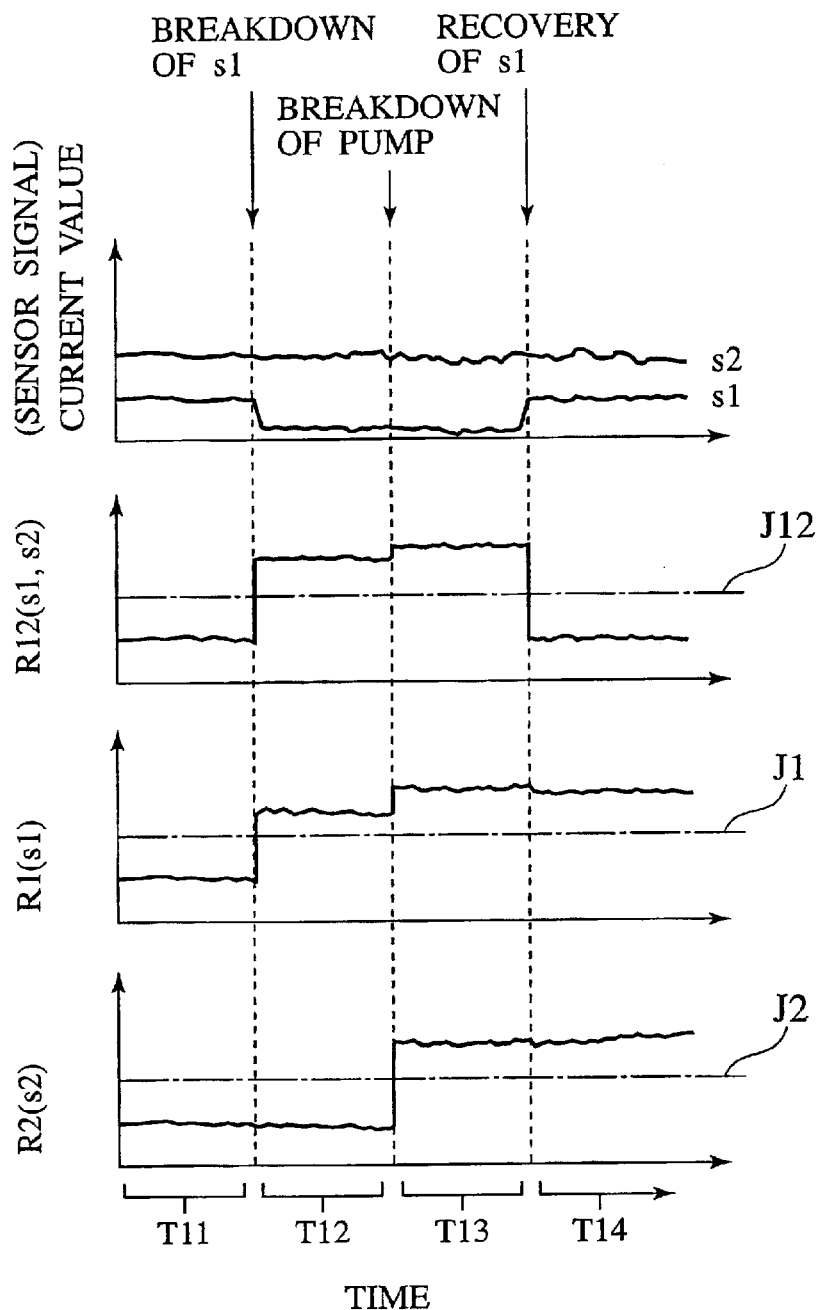
FIGS. 9A to 9D are illustrations for explaining a signal-processing flow of a diagnostic method used when diagnosing with a failure diagnostic apparatus of second embodiment.

In the second embodiment, the diagnostic method using the pump sensor signals s1 and s2 is described. The pump sensor signals s1 and s2 are outputted to the pump diagnostic apparatus 5 at the timings T11, T12, T13, and T14 as shown in FIG. 9A. The abscissa denotes time. The abscissas of FIGS. 9B to 9D also denote time of the same scale. The ordinate denotes current value showing the signal intensity of the pump sensor signals s1 and s2. the pump sensor 11 for outputting the pump sensor signal s1 is broken down at the timing between times T11 and T12. The pump 3 in which the pump sensors 11 and 12 are arranged is broken at the timing between times T12 and T13. The pump sensor 11 for outputting the pump sensor signal s1 recovers at the timing between times T13 and T14. It is possible to observe the breakdown and recovery of the pump sensor 11 according to the pump sensor signal s1. However, it is impossible to observe the failure in the pump 3 according to the pump sensor signals s1 and s2.

The abscissa in FIG. 9B denotes the scalar distance R12(s1, s2). The abscissa in FIG. 9C denotes the scalar distance R1(s1). The abscissa in FIG. 9D denotes the scalar distance R2(s2). The scalar distance R12(s1, s2) exceeds the normal range J12 on the times T12 and T13. The scalar distance R1(s1) exceeds the normal range J1 on the times T12, T13, and T14. The scalar distance R2(s2) exceeds the normal range J2 on the times T13 and T14.

As shown in FIG. 10, the flag signals F12, F1, and F2 are outputted at each time T11 to T14. Thereby, it is possible to determine the failure in the pump 3 according to the flag signal F2. It is possible to determine the failure in the pump sensor 11 according to the flag signal F12.

(Third Embodiment)

In the first embodiment, the scalar distances and the flag signals of every subset of the sensor signals are obtained. By handing every subset, the reproducibility of the diagnostic is improved. But, the number of the subsets greatly increases according to the increase of the number of the pump sensor signals.

Therefore, in the third embodiment, the number of the subsets is equal to the number of the pump sensor signals. As shown in FIG. 11, the subsets are constituted by the subsets (s1, s2) of the flag signal F12, (s1, s3) of the flag signal F13, and (s2, s3) of the flag signal F23. The subsets (s1, s2), (s1, s3), and (s2, s3) are formed by removing one member from the universal set (s1, s2, s3). It is possible to uniformly generate the subsets (s1, s2), (s1, s3), and (s2, s3). Therefore, the reproducibility of the diagnostic is improved.

In the case 11, all flag signals F12, F13, and F23 are 0. The determination 0 is outputted which shows that the vacuum pump 3(P) and all pump sensors 11(s1), 12(s2), and 13(s3) are normal.

In the case 12, the flag signals F12 and F13 are 1. The flag signal F23 is 0. The determination 0 is outputted which shows that the vacuum pump 3 and the pump sensors 12 and 13 are normal. The determination 1 is outputted which shows that the pump sensor 11 is normal. These determinations are based on the assumption that two or more of the pump sensors 11 to 13 do not become abnormal at the same time.

In the case 15, all flag signals F12, F13, and F23 are 1. The determination 1 is output which shows that the vacuum pump 3(P) is abnormal. This is because it is very rare that two or more of the pump sensors 11(s1), 12(s2), and 13(s3) become abnormal at the same time.

(Fourth Embodiment)

Also as the fourth embodiment, the number of subsets is equal to the number of sensor signals similar to the case of the third embodiment. As shown in FIG. 12, the universal set (s1, s2, s3, s4) has four members. The subsets are constituted by the four subsets (s1, s2, s3), (s1, s2, s4), (s1, s3, s4), and (s2, s3, s4) removing one member from the universal set (s1, s2, s3, s4). It is possible to uniformly generate these four subsets (s1, s2, s3), (s1, s2, s4), (s1, s3, s4), and (s2, s3, s4). Therefore, the reproducibility of diagnostic is improved.

In the case 21, all flag signals F123, F124, F134, and F234 are 0. The determination 0 is outputted which shows that a vacuum pump 3(P) and all pump sensors 11(s1), 12(s2), 13(s3) and 14(s4) are normal.

In the case 22, the flag signals F123, F124, and F134 are 1. The flag signal F234 is 0. The determination 0 is outputted which shows that the vacuum pump 3 and the pump sensors 12, 13, and 14 are normal. The determination 1 is outputted which shows that the pump sensor 11 is abnormal. These determinations are based on the assumption that two or more of the pump sensors 11 to 14 do not become abnormal at the same time.

In the case 26, all flag signals F123, F124, F134, and F234 are 1. The determination 1 is outputted which shows that the vacuum pump 3(P) is abnormal. This is because it is very rare that two or more of the sensors 11(s1), 12(s2), 13(s3), and 14(s4) become abnormal at the same time.

(Fifth Embodiment)

In the fifth embodiment, the recognition space D306 is a Mahalanobis space. The scalar distance is the Mahalanobis-Taguchi distance. The action for changing the diagnostic method of the first embodiment is described.

Figure 13:
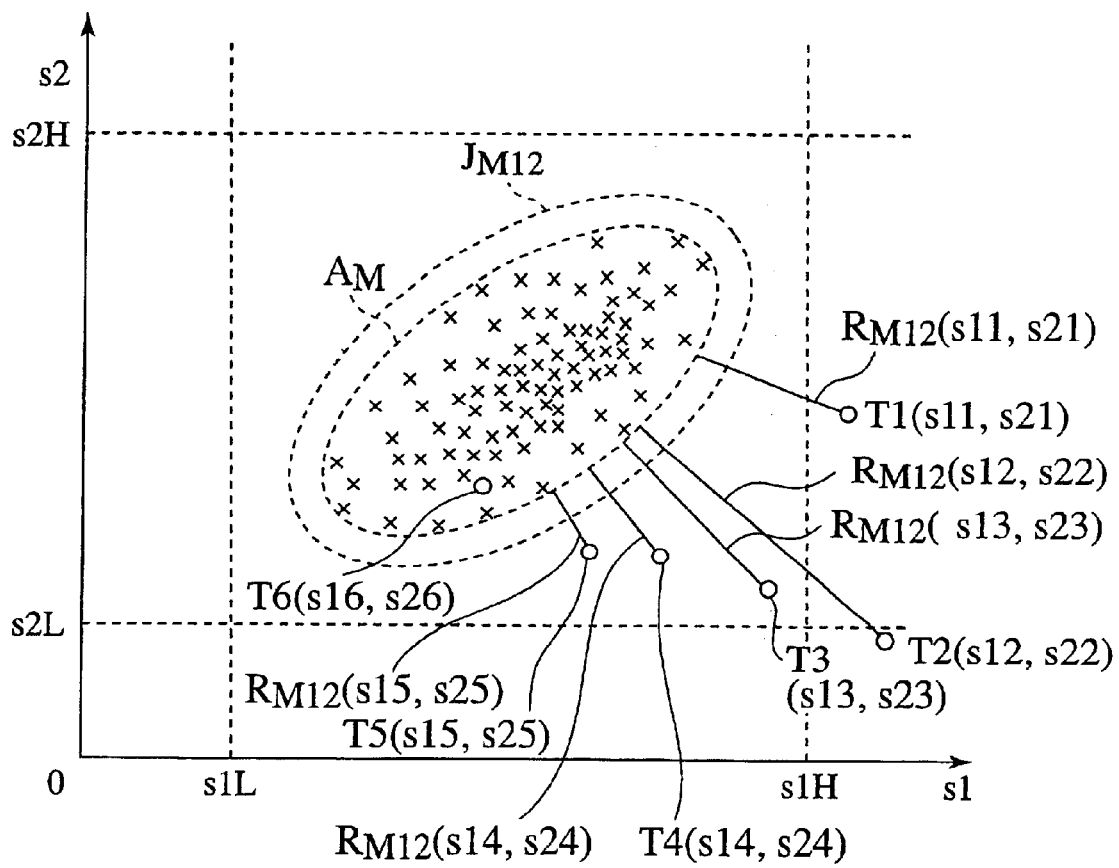
FIG. 13 is a conceptual illustration of Mahalanobis space, normal range, and Mahalanobis-Taguchi distance of a subset (S1,S2) of failure diagnostic apparatus of fifth embodiment.

As the action S303 in FIG. 3, the recognition-space constituting section 42 constitutes the Mahalanobis space AM of every combination (s1, s2, s3), (s1, s2), (s1, s3), (s2, s3), (s1), (s2), (s3) D304 according to the sensor signals s1, s2, and s3 (63) is inputted in the normal state. As shown in FIG. 13, the Mahalanobis space AM of the combination (s1, s2) can be considered as the ellipse on the plane of coordinates containing the rectangular coordinate axes s1 and s2. The marks x denote points obtained by plotting values of the sensor signals s1 and s2 inputted every hour in the normal state. The Mahalanobis space AM is set so as to include the marks x. Specifically, the recognition-space constituting section 42 sets the coefficients of the Mahalanobis-Taguchi distance RM showing the Mahalanobis space AM.

In the action S309 of FIG. 3, as shown in FIG. 13, the normal-range setting section 43 sets the normal range JM12 of the Mahalanobis space AM of the combination (s1, s2) D304 according to the variance a of the marks x in the Mahalanobis space AM. Specifically, the J-value JM12 serving as the criterion of the magnitude of the Mahalanobis-Taguchi distance RM is set.

Figure 14:
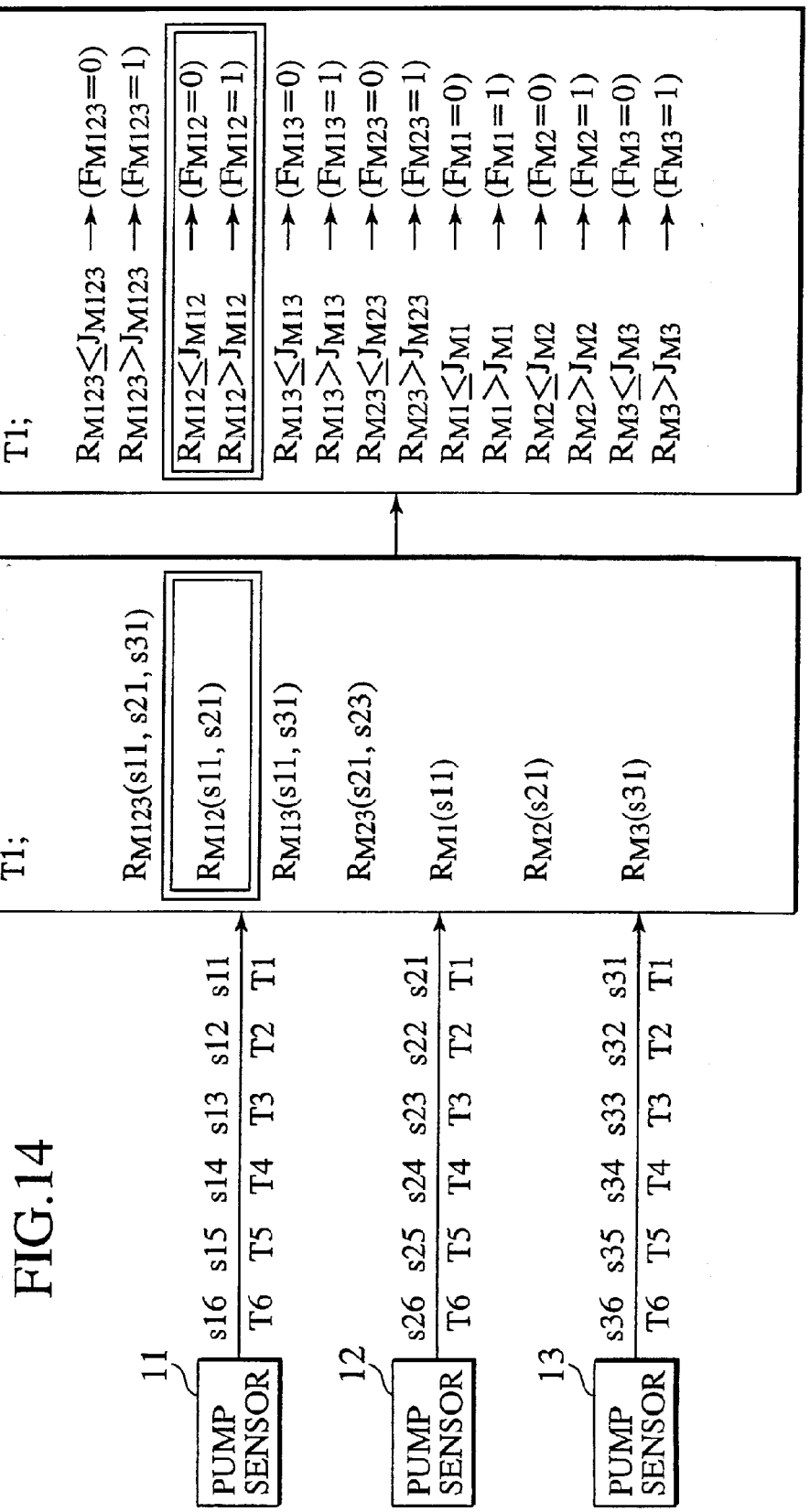
FIG. 14 is an illustration for explaining a signal-processing flow of a diagnostic method used when diagnosing with the failure diagnostic apparatus of the fifth embodiment.
Figure 17:
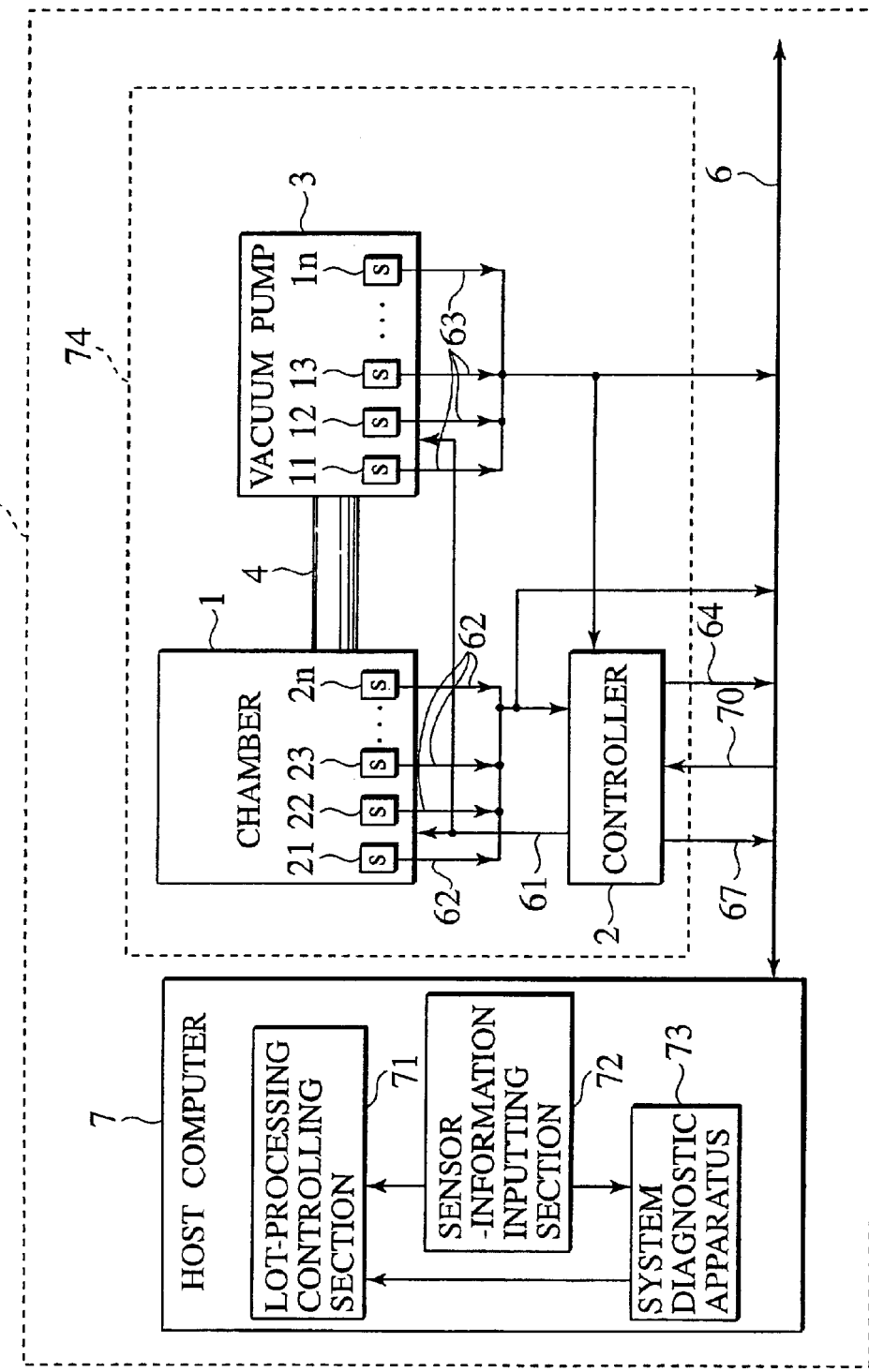
FIG. 17 is a block diagram of a CIM system having a failure diagnostic apparatus of seventh embodiment and a lot processor.

In the action S401 of FIG. 4, as shown in FIG. 14, the sensor-signal inputting section 51 inputs the sensor signals s11, s21, and s31 from the pump sensors 11 to 13 at the timing T1. The sensor-signal inputting section 51 successively inputs the sensor signals s12 to s16, s22 to s26, and s32 to s36 from the pump sensors 11 to 13 at the timings T2 to T6.

As the action S402, the operating section 52 combines the sensor signals s11, s21, and s31 at the timing T1 about every subsets (s1, s2, s3), (s1, s2), (s1, s3), (s2, s3), (s1), (s2), (s3). The operating section 52 generates the subsets (s11, s21, s31), (s11, s21), (s11, s31), (s21, s31), (s11), (s21), (s31) from the universal set (s11, s21, s31).

As the action S403, the operating section 52 computes Mahalanobis-Taguchi distances RM123(s11, s21, s31), RM12(s11, s21), RM13(s11, s31), RM23(s21, s31), RM1 (s11), RM2(s21), and RM3(s31) in the Mahalanobis space AM about all of subsets (s11, s21, s31), (s11, s21), (s11, s31), (s21, s31), (s11), (s21), (s31).

As shown in FIG. 13, the Mahalanobis-Taguchi distance RM12(s11, s21) is computed according to the sensor signals s11 and s21. The Mahalanobis-Taguchi distance RM12(s12, s22) is computed according to the sensor signals s12 and s22 inputted at the timing T2. The Mahalanobis-Taguchi distance RM12(s13, s23) is computed according to the sensor signals s13 and s23 inputted at the timing T3. The Mahalanobis-Taguchi distance RM12(s14, s24) is computed according to the sensor signals s14 and s24 inputted at the timing T4. The Mahalanobis-Taguchi distance RM12(s15, s25) is computed according to the sensor signals s15 and s25 inputted at the timing T5. The Mahalanobis-Taguchi distance RM12(s16, s26) is computed according to the sensor signals s16 and s26 inputted at the timing T6.

As the action S404, the flag-signal outputting section 53 determines whether or not the Mahalanobis-Taguchi distances RM123(s11, s21, s31), RM12(s11, s21), RM13(s11, s31), RM23(s21, s31), RM1(s11), RM2(s21), and RM3(s31) are included in the normal ranges JM123, JM12, JM13, JM23, JM1, JM2, and JM3 of the Mahalanobis space AM. The flag-signal setting section 53 outputs the flag signals FM123, FM12, FM13, FM23, FM1, FM2, and FM3 according to the above determination.

As shown in FIG. 13, the Mahalanobis-Taguchi distance RM12(s11, s21) at the timing T1 is larger than the normal range JM12. The flag signal FM12 at the timing T1 is 1 (abnormal). The Mahalanobis-Taguchi distance RM12(s12, s22) at the timing T2 is larger than the normal range JM12. The flag signal FM12 at the timing T2 is 1 (abnormal). The Mahalanobis-Taguchi distance RM12(s13, s23) at the timing T3 is larger than the normal range JM12. The flag signal FM12 at the timing T3 is 1 (abnormal). The Mahalanobis-Taguchi distance RM12(s14, s24) at the timing T4 is larger than the normal range JM12. The flag signal FM12 at the timing T4 is 1 (abnormal). The Mahalanobis-Taguchi distance RM12(s15, s25) at the timing T5 is larger than the normal range JM12. The flag signal FM12 at the timing T5 is 1 (abnormal). The Mahalanobis-Taguchi distance RM12 (s16, s26) at the timing T6 is smaller than the normal range J12. The flag signal F12 at the timing T6 is 0 (normal).

In FIG. 13 and FIG. 7, the values of the flag signals F12 at the timings T4 and T5 differ from each other. The flag signals F12 at the timings T4 and T5 in FIG. 13 are 1 (abnormal). However, the flag signals F12 at the timings T4 and T5 in FIG. 7 are 0 (normal). Therefore, the diagnostic method using the Mahalanobis-Taguchi distance RM12 makes it possible to improve failure-detection sensitivity.

The Mahalanobis spaces AM of every flag signal are obtained. The Mahalanobis spaces AM are the statistical values of the reference space setting in operating normally of each pump sensor. The inverse matrixes of the obtained Mahalanobis spaces AM are obtained. The Mahalanobis-Taguchi distances RM123 (s11, s21, s31), RM12 (s11, s21), RM13 (s11, s31), RM23 (s21, s31), RM1 (s11), RM2 (s21), and RM3 (s31) are obtained by the inverse matrixes and the normalized values obtained from the sensor signals successively-collected s11 to s16, s21 to s26 and s31 to s36. The presence or absence of a sensor failure is determined according to the Mahalanobis-Taguchi distances RM123 (s11, s21, s31), RM12 (s11, s21), RM13 (s11, s31), RM23 (s21, s31), RM1 (s11), RM2 (s21), and RM3(s31).

That is, when the sensors 11 to 13 are operating normally, the computed Mahalanobis-Taguchi distances RM123 (s11, s21, s31), RM12 (s11, s21), RM13 (s11, s31), RM23 (s21, s31), RM1 (s11), RM2 (s21), and RM3 (s31) are approximately 1. As the state of the pump 3 deviates from the normal state, the Mahalanobis-Taguchi distances RM123 (s11, s21, s31), RM12 (s11, s21), RM13 (s11, s31), RM23 (s21, s31), RM1(s11), RM2(s21), and RM3(s31) increase. Experientially, when the Mahalanobis-Taguchi distances enter the range of approximately 4 to 8, the state of the pump 3 is regarded to be abnormal. It is also allowable to experimentally decide the determination range of the Mahalanobis-Taguchi distances.

By using the Mahalanobis-Taguchi distances RM123(s11, s21, s31), RM12(s11, s21), RM13(s11, s31), RM23(s21, s31), RM1(s11), RM2(s21), and RM3(s31), the determination range of the subsets of the pump sensors can be united into one criterion of the determination range. Therefore, it is possible to use different types of the pump sensors. Moreover, even if the values shown by the pump sensors greatly differ from each other, it is possible to consider the fluctuation of the sensor values. Therefore, it is possible to use all types of sensor signals.

The normal ranges JM123, JM12, JM13, JM23, JM1, JM2, and JM3 serve as the criteria of the determination ranges of the Mahalanobis-Taguchi distances RM123(s1, s2, s3), RM12(s11, s21), RM13(s11, s31), RM23(s21, s31), RM1(s11), RM2(s21), and RM3(s31). The normal ranges JM123, JM12, JM13, JM23, JM1, JM2, and JM3 are predetermined constants. Values of the normal ranges JM123, JM12, JM13, JM23, JM1, JM2, and JM3 are decided by the fluctuation of values of the sensor signals s1 to s3 in the normal state. The normal ranges are set on the ranges in the 3σ of the fluctuation in the normal state.

(Sixth Embodiment)

In the sixth embodiment, the recognition space D306 is the Mahalanobis space. The scalar distance is the Mahalanobis-Taguchi distance. The diagnostic method in the sixth embodiment uses the eight sensor signals s1 to s8.

As shown in FIG. 15A, the sensor signals s1 to s8 are outputted to the pump diagnostic apparatus 5 at the timings T21, T22, T23, and T24. However, the sensor signals s5 to s8 are not illustrated in FIG. 15A. The abscissa denotes time. The abscissas of FIGS. 15B and 15C also denote time of the same scale. The ordinate of FIG. 15A respectively denote sensor-signal intensity. Eight types of the sensor values such as current value and temperature of a vacuum pump 3 are shown in time series.

The pump sensor 11 outputting the sensor signal s1 causes the short-circuit failure at 70 sec between the times T21 and T22. The vacuum pump 3 is broken at 120 sec between the times T22 and T23. The pump sensor 11 recovers from the short-circuit failure at 170 sec between the times T23 and T24.

In FIG. 15A, it is possible to observe breakdown and recovery of the sensor 11 according to the sensor signal s1. However, it is impossible to observe the failure in the system of the pump 3 according to the sensor signals s1 to s4.

The ordinate of FIG. 15B denotes the Mahalanobis-Taguchi distance RM(s1, s2, s3, s4, s5, s6, s7, s8). The ordinate of FIG. 15C denotes the Mahalanobis-Taguchi distance RM(s2, s3, s4, s5, s6, s7, s8). The Mahalanobis-Taguchi distance RM(s1, s2, s3, s4, s5, s6, s7, s8) exceeds the normal range JM12345678 at the times T22 and T23. The Mahalanobis-Taguchi distance RM(s2, s3, s4, s5, s6, s7, s8) exceeds the normal range JM2345678 at the times T23 and T24.

As shown in FIG. 16, the flag signals FM (s1, s2, s3, s4, s5, s6, s7, s8) and FM(s2, s3, s4, s5, s6, s7, s8) are outputted every times T21 to T24. Thus, it is possible to determine the failure in the pump 3 according to the flag signal FM(s2, s3, s4, s5, s6, s7, s8). It is possible to determine the failure in the sensor 11 according to the flag signal FM (s1, s2, s3, s4, s5, s6, s7, s8).

The inverse matrixes X12345678 and X2345678 for obtaining the Mahalanobis-Taguchi distance RM(s1, s2, s3, s4, s5, s6, s7, s8) and RM(s2, s3, s4, s5, s6, s7, s8) are computed using the sensor signals s1, s2, s3, s4, s5, s6, s7, s8 between 0 and 20 sec as the normal sensor signals. FIG. 15B shows the time history of the Mahalanobis-Taguchi distance RM(s1, s2, s3, s4, s5, s6, s7, s8). FIG. 15C shows the time history of the Mahalanobis-Taguchi distance RM(s2, s3, s4, s5, s6, s7, s8). The Mahalanobis-Taguchi distance RM(s1, s2, s3, s4, s5, s6, s7, s8) is obtained from the products of the inverse matrix X12345678 and the vector (s1, s2, s3, s4, s5, s6, s7, s8) obtained momentarily from the pump sensors 11 to 18. The Mahalanobis-Taguchi distance RM(s1, s2, s3, s4, s5, s6, s7, s8) shows that the failure is detected at 70 sec and the normal state is recovered at 170 sec. More precisely, at 120 sec when the vacuum pump 3 is broken, the slight fluctuation of the Mahalanobis-Taguchi distance RM(s1, s2, s3, s4, s5, s6, s7, s8) is observed. Moreover, The Mahalanobis-Taguchi distance RM(s1, s2, s3, s4, s5, s6, s7, s8) after 170 sec different from The Mahalanobis-Taguchi distance RM(s1, s2, s3, s4, s5, s6, s7, s8) before 70 sec through detailed observation.

However, the sensor failures usually include the above-described short-circuit failure, an open failure, and a communication failure in a computer. The changing rate of the sensor signals of them is very large. Therefore, when the sensor failures occur, it is observed as if the failure in the vacuum pump 3. And it is actually impossible to detect the slight change through the above detailed observation.

The Mahalanobis-Taguchi distance RM(s2, s3, s4, s5, s6, s7, s8) as shown in FIG. 15C is obtained from the products of the inverse matrix X2345678 and the vector (s2, s3, s4, s5, s6, s7, s8) obtained momentarily from the pump sensors 12 to 18. The failure in the pump sensor 11 is not detected at all. Only the slight fluctuation by the failure of the vacuum pump 3 is accurately detected at 120 sec. It is possible to reliably detect the failure in the vacuum pump 3 by setting the normal range JM2345678 at 10 to 30.

Moreover, by integrating results of FIGS. 15B and 15C, it can be understood that the failure occurs in the sensor 11 at 70 sec, the failure occurs in the vacuum pump 3 at 120 sec, and the pump sensor 11 recovers from the failure at 170 sec. The determination result is transferred to a host computer 7. The place where the failure occurs and the time of the occurrence and the recovery are displayed on the display unit.

(Seventh Embodiment)

In the first embodiment, as shown in FIG. 1, the lot processor 75 has the diagnostic apparatus 5 and 8. In the seventh embodiment, the host computer 7 has the system diagnostic apparatus 73. And the host computer 7 has the lot-processing controlling section 71 and the sensor-information inputting section 72. The system diagnostic apparatus 73 has the same function as the pump diagnostic apparatus 5. Thereby, it is possible to decrease the number of the system diagnostic apparatus 73. The lot-processing controlling section 71 controls the lot processing according to the diagnostic result by the system diagnostic apparatus 73 and the information of the pump sensors 11 to 1n and the chamber sensors 21 to 2n. The sensor-information inputting section 72 inputs the chamber information 62 and the sensor information 63 through the LAN 6. The sensor-information inputting section 72 outputs the chamber information 62 and the sensor information 63 to the lot-processing controlling section 71 and the system diagnostic apparatus 73.

The present invention may be embodied in other specific forms without departing from the spirit or essential characteristics thereof. The embodiments are therefore to be considered in all respects as illustrative and not restrictive, the scope of the present invention being indicated by the appended claims rather than by the foregoing description, and all changes which come within the meaning and range of equivalency of the claims are therefore intended to be embraced therein.

What is claimed is:

1. A diagnostic apparatus for detecting a failure in an equipment, comprising:

an inputting section configured to input sensor signals from sensors attached to the equipment;

an operating section configured to compute scalar distances in recognition spaces of combinations of the sensor signals;

a flag signal outputting section configured to output flag signals of the combinations according to whether the scalar distances are included in normal ranges of the recognition spaces of the combinations; and a determining section configured to determine the failure by the flag signals.

2. The diagnostic apparatus of claim 1, further comprising:
a normal range setting section configured to set the normal ranges by variances of the recognition spaces.

3. The diagnostic apparatus of claim 1, further comprising:
an outputting section configured to output a determining result of the failure of the equipment.

4. The diagnostic apparatus of claim 1, wherein the recognition spaces are Mahalanobis spaces and the scalar distances are Mahalanobis-Taguchi distances.

5. The diagnostic apparatus of claim 1, further comprising:
a recognition space constituting section configured to constitute the recognition spaces by the sensor signals inputted in the normal state of the equipment.

6. The diagnostic apparatus of claim 5, further comprising:
a normal range setting section configured to set the normal ranges by variances of the recognition spaces.

7. The diagnostic apparatus of claim 1, further comprising:
a determination data generating section configured to generate the combinations and generate determination data capable of determining the failure of the equipment by the flag signals.

8. The diagnostic apparatus of claim 7, wherein the determination data make it possible to determine abnormal of the sensors by the flag signals.

9. The diagnostic apparatus of claim 7, wherein said determining section determines by the determination data.

10. The diagnostic apparatus of claim 7, wherein the determination data include a collative area recording cases of the flag signals and being able to collate the cases, and a state area recording states of the equipment related to the cases.

11. A diagnostic method for detecting a failure in an equipment, comprising:
inputting sensor signals from sensors attached to the equipment;
computing scalar distances of recognition spaces of combinations of the sensor signals;
outputting flag signals of the combinations according to whether the scalar distances are included in normal ranges of the recognition spaces of the combinations; and
determining the failure according to the flag signals.

12. The diagnostic method of claim 11, further comprising:
setting the normal ranges by variances of the recognition spaces.

13. The diagnostic method of claim 11, further comprising:
outputting a determining result of the failure of the equipment.

14. The diagnostic method of claim 11, wherein the recognition spaces are Mahalanobis spaces and the scalar distances are Mahalanobis-Taguchi distances.

15. The diagnostic method of claim 11, further comprising:
constituting the recognition spaces by the sensor signals inputted in the normal state of the equipment.

16. The diagnostic method of claim 15 further comprising:
setting the normal ranges by variances of the recognition spaces.

17. The diagnostic method of claim 11, further comprising:
generating the combinations; and
generating determination data capable of determining the failure in the equipment by the flag signals.

18. The diagnostic method of claim 17, wherein the determination data make it possible to determine abnormal of the sensors by the flag signals.

19. The diagnostic method of claim 17, wherein said determining is determining by the determination data.

20. The diagnostic method of claim 17, wherein the determination data include a collative area recording cases of the flag signals and being able to collate the cases, and a state area recording states of the equipment related to the cases.

21. A computer integrated manufacturing system comprising:
an equipment configured to manufacture;
sensors configured to output sensor signals about said equipment;
an inputting section configured to input the sensor signals;
an operating section configured to compute scalar distances in recognition spaces of combinations of the sensor signals;
a flag signal outputting section configured to output flag signals of the combinations according to whether the scalar distances are included in normal ranges of the recognition spaces of the combinations; and
a determining section configured to determine a failure of the equipment by the flag signals.

22. The computer integrated manufacturing system of claim 21, further comprising:
a normal range setting section configured to set the normal ranges by variances of the recognition spaces.

23. The computer integrated manufacturing system of claim 21, further comprising:
an outputting section configured to output a determining result of the failure of the equipment.

24. The computer integrated manufacturing system of claim 21, wherein the recognition spaces are Mahalanobis spaces and the scalar distances are Mahalanobis-Taguchi distances.

25. The computer integrated manufacturing system of claim 21, further comprising:
a recognition space constituting section configured to constitute the recognition spaces by the sensor signals inputted in the normal state of said equipment.

26. The computer integrated manufacturing system of claim 25, further comprising:
a normal range setting section configured to set the normal ranges by variances of the recognition spaces.

27. The computer integrated manufacturing system of claim 21, further comprising:
a determination data generating section configured to generate the combinations and generate determination data capable of determining the failure of the equipment by the flag signals.

28. The computer integrated manufacturing system of claim 27, wherein the determination data make it possible to determine abnormal of the sensors by the flag signals.

29. The computer integrated manufacturing system of claim 27, wherein said determining section determines by the determination data.

30. The computer integrated manufacturing system of claim 27, wherein the determination data include a collative area recording cases of the flag signals and being able to collate the cases, and a state area recording states of the equipment related to the cases.

* * * * *

UNITED STATES PATENT AND TRADEMARK OFFICE
CERTIFICATE OF CORRECTION

PATENT NO. : 6,782,348 B2
DATED : August 24, 2004
INVENTOR(S) : Ushiku

It is certified that error appears in the above-identified patent and that said Letters Patent is hereby corrected as shown below:

<u>Title page,</u>
Item [*] Notice, "by 110 days." should read -- by 204 days. --.

Signed and Sealed this

Twenty-second Day of February, 2005

JON W. DUDAS
*Director of the United States Patent and Trademark Office*